(12) United States Patent
Sachweh et al.

(10) Patent No.: US 7,799,373 B2
(45) Date of Patent: Sep. 21, 2010

(54) IN SITU RECOATING OF CATALYST BEDS

(75) Inventors: Bernd Sachweh, Meckenheim (DE);
Günther Huber, Mannheim (DE);
Mark Duda, Ludwigshafen (DE);
Torsten Mattke, Freinsheim (DE);
Gerhard Olbert, Dossenheim (DE)

(73) Assignee: BASF SE, Ludwigshafen (DE)

( * ) Notice: Subject to any disclaimer, the term of this patent is extended or adjusted under 35 U.S.C. 154(b) by 833 days.

(21) Appl. No.: 10/551,858

(22) PCT Filed: Apr. 2, 2004

(86) PCT No.: PCT/EP2004/003497

§ 371 (c)(1),
(2), (4) Date: Oct. 3, 2005

(87) PCT Pub. No.: WO2004/087319

PCT Pub. Date: Oct. 14, 2004

(65) Prior Publication Data

US 2006/0205586 A1    Sep. 14, 2006

(30) Foreign Application Priority Data

Apr. 3, 2003 (DE) ............................... 103 15 215

(51) Int. Cl.
*B05D 7/22* (2006.01)

(52) U.S. Cl. .................................................. 427/237

(58) Field of Classification Search .......... 427/230–239
See application file for complete search history.

(56) References Cited

U.S. PATENT DOCUMENTS

| 3,293,290 A | * | 12/1966 | Flint et al. | .................. | 562/545 |
|---|---|---|---|---|---|
| 5,254,168 A | | 10/1993 | Littman et al. | | |
| 5,491,258 A | * | 2/1996 | Watanabe et al. | ........... | 562/538 |
| 5,821,187 A | * | 10/1998 | Zahn et al. | ..................... | 502/22 |
| 7,038,065 B2 | * | 5/2006 | Franz et al. | ................. | 549/307 |
| 2002/0029955 A1 | | 3/2002 | Sahle-Demessie et al. | | |

FOREIGN PATENT DOCUMENTS

| DE | 102 40 605 | 2/2004 |
|---|---|---|
| EP | 0 574 173 | 12/1993 |
| WO | WO 99/41011 A1 * | 8/1999 |
| WO | WO 02/12158 A2 * | 2/2002 |
| WO | WO-03/008093 | 1/2003 |
| WO | WO-2004/036004 | 4/2004 |

* cited by examiner

*Primary Examiner*—William Phillip Fletcher, III
(74) *Attorney, Agent, or Firm*—Connolly Bove Lodge & Hutz LLP

(57) ABSTRACT

A process for coating internals in a reactor, except for the coating of electrically heatable, at least partly open-cell foams, with a catalytically active material or a precursor thereof, in which an aerosol which contains the catalytically active material or the precursor thereof as a disperse phase is provided and the aerosol is passed through the reactor at a rate in the range from 0.1 to 4 m/s, which is established so that the disperse phase of the aerosol is deposited on the internals in the reactor.

21 Claims, 3 Drawing Sheets

IN SITU RECOATING OF CATALYST BEDS

RELATED APPLICATIONS

This application is a national stage application (under 35 U.S.C. 371) of PCT/EP2004/003497 filed Apr. 2, 2004 which claims benefit to German application 103 15 215.6 filed Apr. 3, 2003.

BACKGROUND OF THE INVENTION

1. Field of the Invention

The present invention relates to a process for coating internals in a reactor and a use.

2. Description of Prior Art

In chemical process engineering, a multiplicity of reactions is carried out under heterogeneous catalysis, the catalyst being present predominantly in the form of a solid and in rare cases also in the form of a liquid, and the reactants and the catalyst being different phases which are in contact with one another.

In the case of heterogeneous catalysis, the reaction takes place at the surface of the catalyst. Internals which have a very large specific surface area with catalytic activity are therefore introduced into reactors for carrying out heterogeneously catalyzed reactions. Such internals are, for example, dumped packing beds or stacked packings.

Dumped packing beds consist of individual packings which are in the form of unsupported catalysts or of supported catalysts. The individual packing itself consists of catalytically active material or is produced by coating an inert support with catalytically active material.

SUMMARY OF THE INVENTION

It is an object of the present invention to coat internals which have already been introduced into reactors for carrying out heterogeneously catalyzed reactions with catalytically active material or with precursors for the formation of catalytically active material, i.e. to permit in situ coating of internals in a reactor for carrying out heterogeneously catalyzed reactions. The process should in particular permit regeneration of deactivated catalyst without it being necessary to remove the catalyst for this purpose and hence without significant losses of time-on-stream for the reactor.

We have found that this object is achieved by a process for coating internals in a reactor, except for the coating of electrically heatable, at least partly open-cell foams, with a catalytically active material or a precursor thereof, in which an aerosol which contains the catalytically active material or the precursor thereof as a disperse phase is provided and the aerosol is passed through the reactor at a rate which is established so that the disperse phase of the aerosol is deposited on the internals in the reactor.

It has surprisingly been found that it is possible to coat internals in a reactor for carrying out heterogeneously catalyzed reactions without time-consuming and expensive removal thereof in the reactor itself with catalytically active material or a precursor for the preparation of catalytically active material.

DETAILED DESCRIPTION OF THE INVENTION

Figure 1:
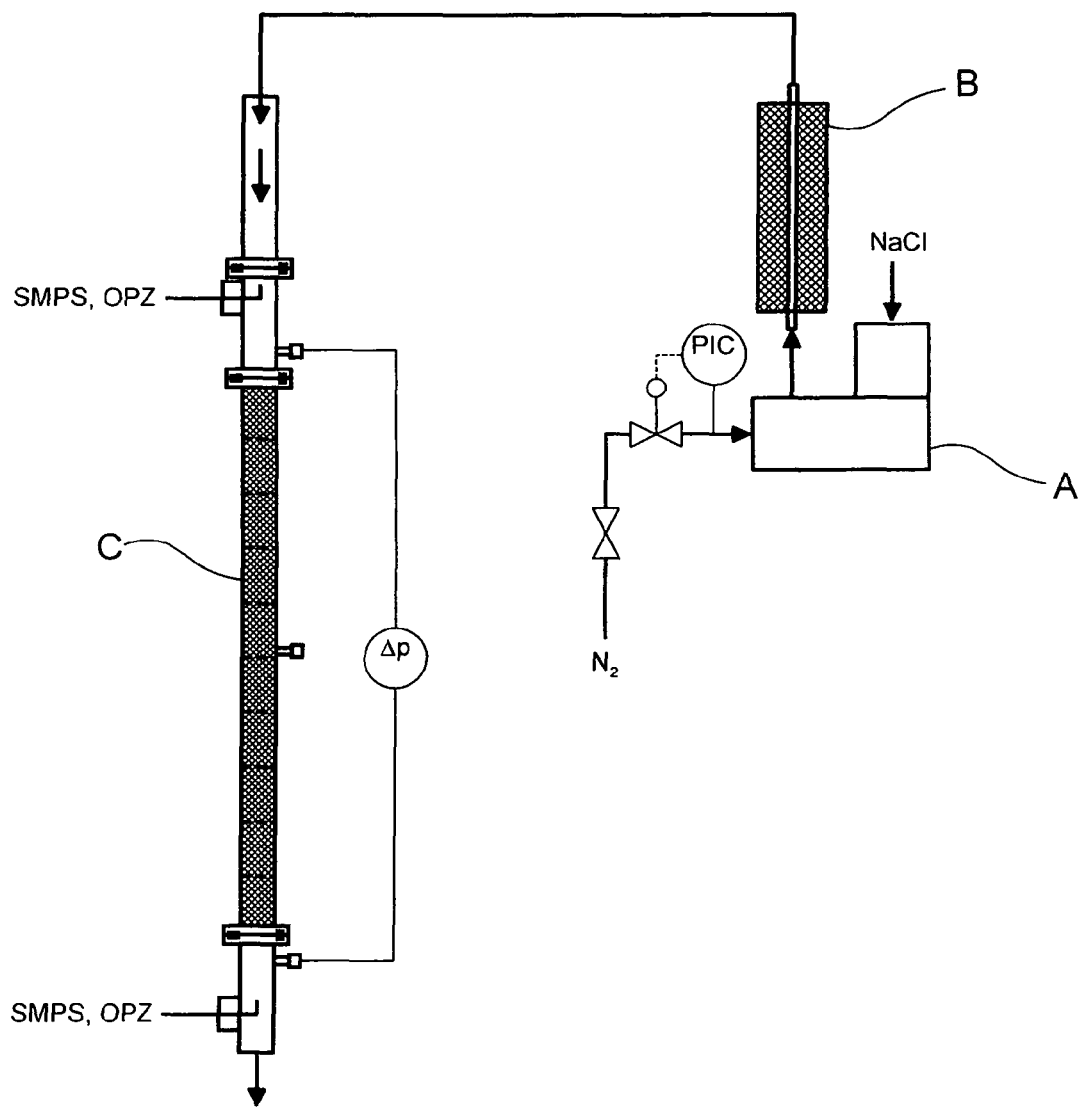
FIG. 1 shows a diagram illustrating the principle of an experimental laboratory unit for coating a packing bed.

For this purpose, it is first necessary to provide an aerosol which contains the catalytically active material or a precursor thereof as the disperse phase. Aerosols are defined in general as colloidal systems of gases with small solid or liquid particles having a particle size of up to 10 µm distributed therein. The catalytically active material appropriate to the respective reaction is chosen as the disperse phase for the aerosol, which material is present as a rule in the form of a solid. This as a rule does not comprise pure substances since most industrial catalysts are mixed catalysts or multi-material catalysts, i.e. also contain further additives in addition to the catalytically active substance. Such additives may be, for example, promoters which enhance the action of the catalyst. Additives too may also act as structural enhancers, preventing sintering with an associated reduction in the surface area, or as binders. Instead of catalytically active substances, it is also possible to use precursors thereof, which are converted into the catalytically active form only in further process steps.

The aerosol can advantageously be produced starting from the catalytically active material present in the form of a solid or from a precursor thereof which is present in the form of a solid, by dry comminution thereof, preferably in stages, and in particular by preliminary comminution, for example in a hammer mill, or very fine comminution in a jet mill, metering, for example via a brush metering means, and dispersing of the comminuted material in an inert gas stream, preferably nitrogen. The metering of the catalytically active material into the inert gas stream should preferably be carried out in a manner such that the upper loading limit of the aerosol with disperse phase, in which the aerosol can still be pneumatically transported, is not exceeded.

A further, frequently used preparation method for the aerosols is the atomization of a liquid phase which may contain a solid in solution or in suspension or the atomization of an emulsion by means of nozzles. Coarse particles, i.e. having a particle size above about 10 µm, are separated off by inertial deposition and the fine particles are sprayed into an inert gas stream. The liquid dispersing medium or solvent is preferably evaporated, in particular by drying or by superheating.

In addition, it is also possible to use further methods for producing aerosols, for example desublimation from the gas phase, flame synthesis or ultrasonic atomization.

Aerosols having a particle size of the disperse phase in the range from 0.1 to 10 µm, particularly preferably in the range from 0.5 to 5 µm, are preferably produced.

The aerosol is then passed through the reactor, the velocity of the aerosol being established so that the disperse phase is deposited onto the internals in the reactor. The aerosol velocity suitable for this purpose can be determined by a person skilled in the art on the basis of the known deposition mechanisms, taking into account the particle properties of the disperse phase, in particular particle size distribution, density, shape, electrostatic charge build-up and proportion of the disperse phase in the aerosol. The effective deposition mechanisms are described in the technical literature, for example in S. Löffler, Staubabscheiden, Georg Thieme Verlag, Stuttgart, 1988. The deposition can be effected on the basis of particle inertia, diffusion motion of the particles as a result of Brownian movement and turbulence, barrier effects, gravity and electrostatic forces.

In the novel process, the empty pipe velocity of the aerosol is preferably brought to the range from 0.1 to 10, particularly preferably from 0.2 to 4, more preferably from 0.2 to 2, m/s.

The term empty pipe velocity denotes in a known manner the quotient of the volume flow rate of the aerosol and the free cross-sectional area of the reactor through which the flow takes place. The free cross-sectional area is to be understood as meaning the cross-sectional area which is accessible to the aerosol, i.e. internals are not included in the free cross-sectional area.

In principle, all types of internals in reactors can be coated by the novel process.

These may preferably be internals comprising moldings which move relative to one another and which may be present in particular as a fixed bed, as a fluidized bed or as a moving bed.

The internals to be coated may also be present in the form of a consolidated, porous, at least partly open-pore system, in particular in the form of woven fabric, knitted fabric, braid or foam, excluding electrically heatable foams. Here, consolidated designates a system that is formed from continuously connected solid which can be only irreversibly separated into individual parts.

Internals having ordered flow channels, in particular stacked packings or monoliths, can also be coated by the novel process. The geometric shape of the flow channels is in principle not limited and, for example, round or polygonal cross sections thereof are possible.

The internals to be coated may also be pipes, in particular ribbed pipes, through which a heating medium is passed.

In many applications, the catalytically active material deposited onto the internals is present in finished form in which the heterogeneously catalyzed reaction can be carried out without further aftertreatment. In these cases, adhesion of the deposited disperse phase of the aerosol by means of van der Waals forces is as a rule sufficient. However, it may also be possible for the deposited disperse phase subsequently to be subjected to further process steps, in particular for it to be activated, fixed and/or calcined.

It is also possible to form the coating with aerosol in a plurality of layers, it being possible for the individual layers applied one on top of the other to be identical or different. It is possible, for example, first to apply a base coat as an adhesion-promoting layer via a suitable aerosol and then to apply the actual catalytically active material, in particular in a monolayer.

It may also be advantageous if the internals to be coated are pretreated, in particular electrostatically charged, before the aerosol is passed through.

An initial coating of internals in reactors can be carried out by the novel process.

However, a particular advantage of the novel process is that it is suitable for reactivating deactivated catalysts in situ, i.e. without time-consuming and expensive removal thereof from the reactor. This reduces catalyst costs and costs due to the loss of production owing to the shutdown of the reactor during the catalyst change and costs for removing and installing the catalyst material.

The introduction of catalytic packing beds into reaction tubes, i.e. catalyst tubes, is as a rule very complicated, particularly if, owing to the reaction profile, mixtures having different compositions and comprising inert material and active catalyst substance have to be introduced and distributed over the length of the catalyst tube. Furthermore, in reactors having a multiplicity of catalyst tubes, it is necessary to compensate a pressure drop in the catalyst tubes in order to ensure uniform flow through all catalyst tubes. In the novel process, this effort for refilling catalyst tubes is avoided by reactivating deactivated catalyst material in situ.

The plant parts already installed, in particular the compressor, can advantageously be used for transporting the aerosol.

The novel process is particularly suitable for use in reactors for carrying out oxidation and dehydrogenation reactions, preferably for synthesizing maleic anhydride, phthalic anhydride, acrolein, (meth)acrylic acid or ethylene oxide.

The invention is explained in more detail below with reference to a drawing and working examples.

Figure 2:
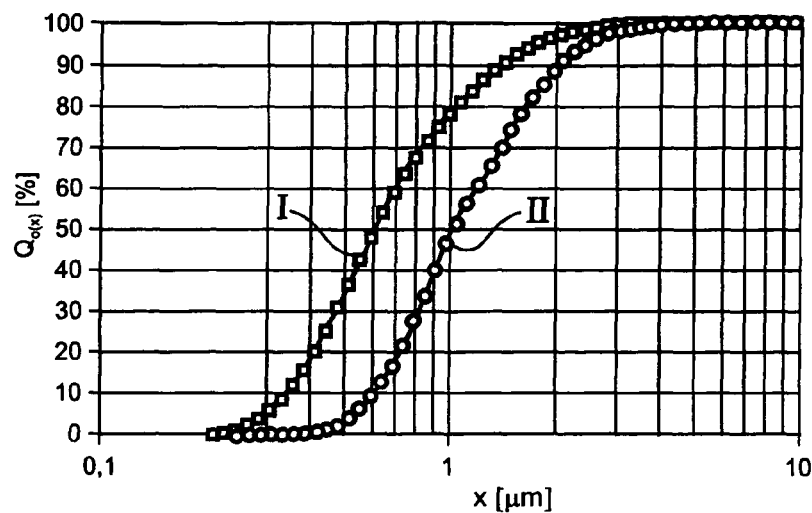
FIG. 2 shows a graph of the particle size distribution for a sodium chloride test aerosol (curve 1) and for an aerosol comprising a catalyst for the preparation of maleic anhydride as disperse phase.
Figure 3:
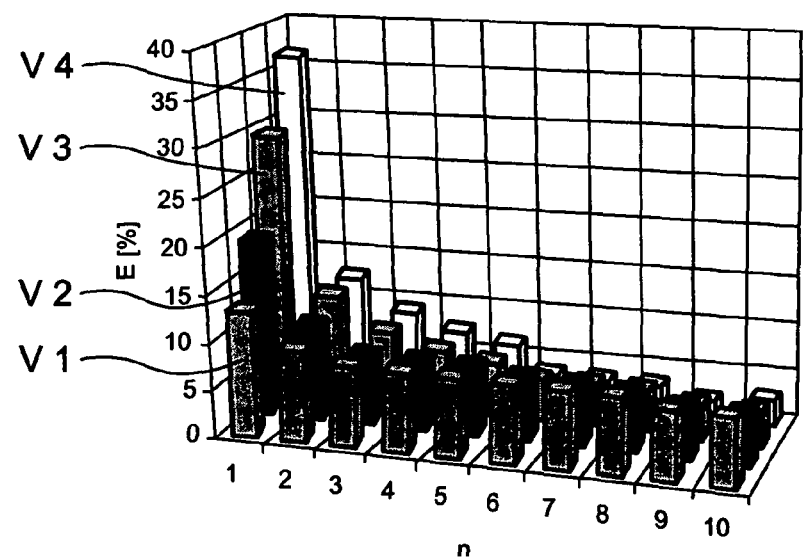
FIG. 3 shows a graph of the percentage of deposited sodium chloride per segment of the packed column and FIGS. 4a and 4b show graphs analogous to FIG. 3 but for dumped packings having different geometric dimensions.
Figure 4A:
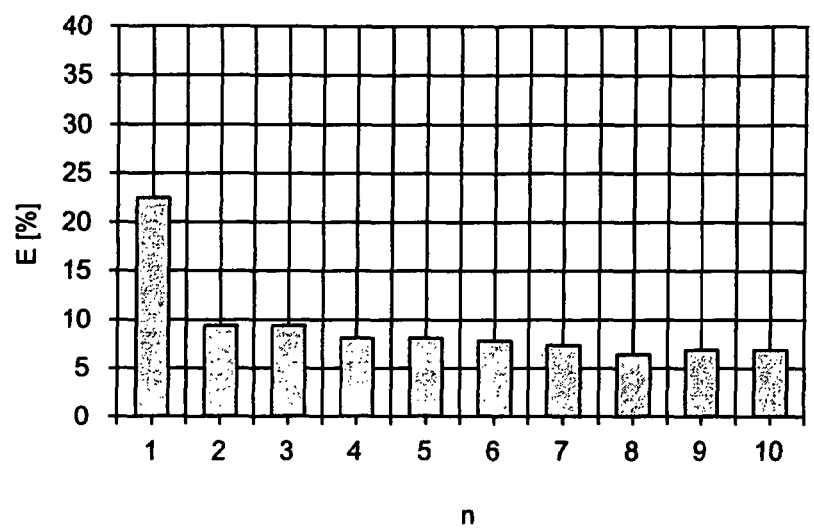
Figure 4B:
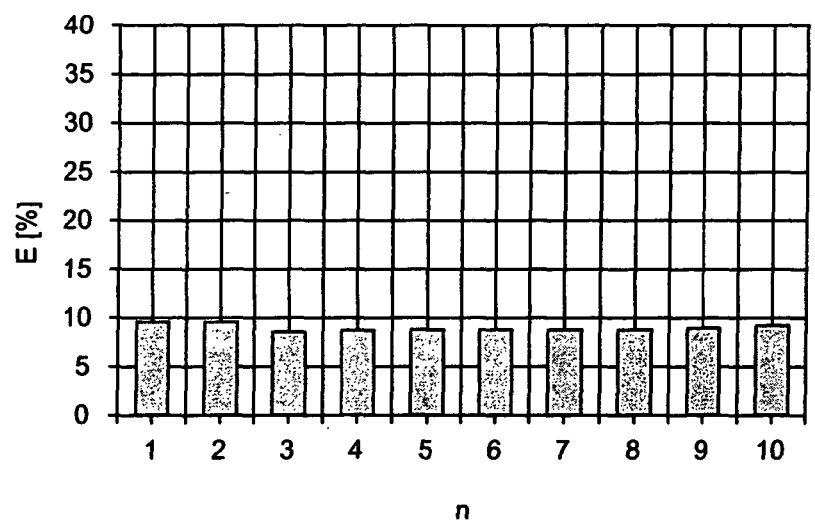

Specifically,

FIG. 1 shows a diagram illustrating the principle of an experimental laboratory unit for coating a packing bed, FIG. 2 shows a graph of the particle size distribution for a sodium chloride test aerosol (curve 1) and for an aerosol comprising a catalyst for the preparation of maleic anhydride as disperse phase, FIG. 3 shows a graph of the percentage of deposited sodium chloride per segment of the packed column and FIGS. 4a and 4b show graphs analogous to FIG. 3 but for dumped packings having different geometric dimensions.

The experimental arrangement shown in FIG. 1 comprises a Collison aerosol generator A in which an aqueous sodium chloride solution, NaCl, is atomized in a known manner via a binary nozzle by means of a nitrogen stream, $N_2$. There, coarse drops are deposited by the action of gravity and impaction, and finer drops emerge with the inert gas stream from the Collison aerosol generator A and are dried in the downstream diffusion dryer B with formation of a sodium chloride aerosol having a solid disperse phase. The aerosol thus produced is passed through two particle counters for measurement of the particle concentration and particle size distribution, i.e. an optical particle counter OPC, having a measuring range from 0.2 to 20 μm and a scanning mobility particle sizer, SMPS, having a measuring range from about 15 to 800 nm.

An optical particle counter (OPC) from Palas GmbH, Karlsruhe, having the following technical data was used:
Suction volume stream: variable up to about 300 l/h,
Pressure range: up to about 100 mbar,
Temperature range: from 0 to 100° C. and
Measuring range: from 0.2 to 20 μm; up to $10^5$ particles per $cm^3$ Characteristic for the mode of operation of all optical particle counters is the delimitation of a small, homogeneously illuminated measuring volume through which the particles must move individually. The intensity of the scattered light which they emit thereby is a measure of the particle size. The assignment of scattered light intensity and particle size is effected by experimental calibration using a test aerosol. In addition, the particles are counted, from which the numerical concentration can be calculated.

For determining particle size distribution and particle concentration in the nanometer range (from 15 to 800 nm), the aerosol was additionally passed through a scanning mobility particle sizer (SMPS) from TSI Inc., St. Paul, USA, having the following technical data:
Suction volume stream: typically 18 l/h,
Pressure range: up to 100 mbar,
Temperature range: from 0 to 100° C. and
Measuring range: from 15 to 800 nm; $10^8$ particles per $cm^3$ The principle of measurement of the SMPS is based on electrostatic classification into monodisperse size fractions which are then passed through a condensation particle counter for measurement of the numerical concentration. By changing the voltage applied to the classifier, the particle size fractions determined by the apparatus are changed.

The aerosol stream characterized in this manner was then passed through a glass tube having a length of 1 m and an internal diameter of 26 mm. 10 trays of the same length, each of which contained the packing bed, were arranged one behind the other in the glass tube. The trays can be removed individually from the glass tube after the experiment, with the result that it is possible to determine the amount of aerosol deposited in each case. The aerosol stream emerging from the glass tube was again characterized by means of an optical particle counter OPC, and an SMPS.

FIG. 2 shows the particle size distribution measured with the optical particle counter for the aerosol before passage through the glass tube containing the packing bed, in particular the measured numerical cumulative distribution, $Q_{0(x)}$ in %, as a function of the particle size in μm.

The upper curve I shows the particle size distribution for a sodium chloride test aerosol having a solids concentration in the aerosol of 285 mg/m$^3$, which was obtained from a sodium chloride starting solution. The lower curve II shows the measured particle size distribution for an aerosol which contained, as disperse phase, the vanadium-phosphorus-oxygen-based catalyst usually used for the catalytic oxidation for the preparation of maleic anhydride.

FIG. 3 shows the experimental results of experiments V1 to V4 described below, specifically the relative amount deposited E (amount deposited per segment, based on the total amount deposited) in % for each of the % segments 1 to 10 of the packing bed.

Analogously, FIGS. 4a and 4b show the experimental results of experiments V5 and V6, respectively, described below, specifically likewise the relative amount deposited E in % for each of the % segments 1 to 10 of the packing bed.

WORKING EXAMPLES

Laboratory experiments for the determination of the deposition of aerosols in a packing bed were carried out using an experimental arrangement shown in FIG. 1.

Annular steatite pellets were used as packing, specifically having the dimensions 5×3×2 (external diameter×height×internal diameter) typical for the catalyst support for the preparation of maleic anhydride for experiments V1 to V4 and having the dimensions 8×6×5 (external diameter×height×internal diameter) typical for the catalyst for the preparation of methacrylic acid in experiments V5 and V6.

In all experiments V1 to V6, a sodium chloride test aerosol was used.

After the aerosol had flowed through the packing bed, the sodium chloride deposited was washed off individually from each segment and the amount of sodium chloride deposited was determined by conductivity measurement.

By measuring the particle size distribution and numerical concentration before and after the flow through the packing bed, the proportion of the deposited aerosol over the total length of the bed can be determined by particle size classes.

In experiments V1 to V4, annular steatite tablets having the dimensions 8×6×5 (external diameter×height×internal diameter), corresponding to the dimensions of the conventional catalyst for the preparation of methacrylic acid, were used.

The table below shows the concentrations of the sodium chloride starting solution, in % by weight, from which the sodium chloride test aerosols were produced in a Collison aerosol generator, and the aerosol velocities, in m/s:

| Experiments | V1 | V2 | V3 | V4 |
|---|---|---|---|---|
| Concentration of sodium chloride starting solution, in % by weight | 1% by wt. | 1% by wt. | 5% by wt. | 5% by wt. |
| Aerosol velocity, in m/s | 1 m/s | 2 m/s | 1 m/s | 2 m/s |

The experimental results are shown in FIG. 3, in particular in each case the relative amount deposited E in % for each of the n segments 1 to 10. The foremost row of bars denoted by V1 represents the results of experiment V1 and analogously the subsequent rows of bars V2 to V4 each represent the results for experiments V2 to V4. The experiments show that the deposition takes place in the form of an exponential curve, the exponential curve becoming steeper with increasing concentration of the sodium chloride starting solution and aerosol velocity.

Annular steatite pellets having different geometric dimensions, in particular the dimensions 5×3×2 (external diameter×height×internal diameter), corresponding to the dimensions of the conventional catalyst for the oxidative preparation of maleic anhydride, were used in experiments V5 and V6.

The total degree of deposition in V2, determined by measuring the difference both before and after the packing bed by means of an optical particle counter, was 50%. Annular steatite pellets having the dimensions 5×3×2 (external diameter×height×internal diameter) and a sodium chloride test aerosol which was obtained starting from a 1% strength sodium chloride starting solution were used. The aerosol empty pipe velocity was 1.74 n/s.

The frequency of deposition per segment of the packing bed is shown in FIG. 4*a*. Dumped packings having the same geometry were used in experiment V6, but a lower concentration of the sodium chloride starting solution was initially used, in particular a 0.5% strength by weight sodium chloride solution. The aerosol empty pipe velocity was 0.93 m/s. The total degree of deposition, measured by means of an optical particle counter analogously to experiment V5, was 10%.

The comparison of experiments V5 and V6 shows that, depending on requirements, different distributions of the deposited particles over the length of the bed can be achieved. In experiment V6, for example, virtually uniform deposition over the total length of the packing bed was achieved.

We claim:

1. A process for coating internals which have previously been introduced into a reactor, except for the coating of electrically heatable, at least partly open-cell foams, with a catalytically active solid material or a precursor thereof, in which an aerosol which contains the catalytically active material or the precursor thereof as a disperse phase is provided and the aerosol is passed through the reactor at a rate in the range of from 0.1 to 4 m/s, which is established so that the disperse phase of the aerosol is deposited on the internals in the reactor and wherein the reactor is employed for carrying out oxidation or dehydrogenation reactions and the oxidation or dehydrogenation reactions are the synthesis of maleic anhydride, phthalic anhydride, acrolein, (meth)acrylic acid, or ethylene oxide.

2. A process as claimed in claim 1, wherein the aerosol is passed through the reactor at a velocity in the range from 0.2 to 4 m/s.

3. A process as claimed in claim 2, wherein the aerosol is passed through the reactor and the velocity in the range from 0.2 to 2 m/s.

4. A process as claimed in claim 3, wherein the disperse phase of the aerosol has a particle size of from 0.5 to 5 µm.

5. A process as claimed in claim 1, wherein the disperse phase of the aerosol has a particle size of from 0.1 to 10 µm.

6. A process as claimed in claim 5, wherein the disperse phase of the aerosol has a particle size of from 0.5 to 5 µm.

7. A process as claimed in claim 1, wherein the aerosol is produced by dry comminution of a solid catalyst or of a precursor of a solid catalyst, to a particle size of from 0.1 to 10 µm metering and dispersing in an inert gas stream.

8. A process as claimed in claim 7, wherein the solid catalyst has a particle size of from 0.2 to 5 µm and the inert gas stream is a nitrogen stream.

9. A process as claimed in claim 1, wherein the aerosol is produced by comminuting, by means of nozzles, a liquid which may have been heated or a liquid mixture, or a solution, suspension or emulsion which may have been superheated.

10. A process as claimed in claim 1, wherein the internals are formed from moldings which are movable relative to one another and are present in the form of a fixed bed, fluidized bed or moving bed.

11. A process as claimed in claim 1, wherein the internals are present in the form of a consolidated, porous system.

12. A process as claimed in claim 11, wherein the consolidated, porous system is woven fabric, knitted fabric, braid or foam; except for electrically heatable foams.

13. A process as claimed in of claim 1, which comprises internals having ordered flow channels.

14. A process as claimed in claim 13, wherein the internals are stacked packings or monoliths.

15. A process as claimed in claim 1, wherein the internals are pipes through which a heating medium is passed.

16. A process as claimed in claim 15, wherein the pipes are ribbed pipes.

17. A process as claimed in claim 1, wherein the disperse phase deposited on the internals in the reactor is subjected to further process steps.

18. A process as claimed in claim 17, wherein the disperse phase deposited on the internals in the reactor is further fixed, activated and/or calcined.

19. A process as claimed in claim 1, wherein the coating is an initial coating.

20. A process as claimed in claim 1, wherein the coating comprises a reactivation of catalyst material on the surface of internals in a reactor.

21. A process for coating internals which have previously been introduced into a reactor, except for the coating of electrically heatable, at least partly open-cell foams, with a catalytically active material or a precursor thereof, in which an aerosol which contains the catalytically active material or the precursor thereof as a disperse phase is provided and the aerosol is passed through the reactor at a rate in the range from 0.1 to 4 m/s, which is established so that the disperse phase of the aerosol is deposited on the internals in the reactor and wherein the reactor is employed for carrying out oxidation or dehydrogenation reactions and the oxidation or dehydrogenation reactions are the synthesis of maleic anhydride, phthalic anhydride, or ethylene oxide.

* * * * *